(12) United States Patent
Kim

(10) Patent No.: US 6,412,943 B2
(45) Date of Patent: Jul. 2, 2002

(54) SPECTACLE FRAME HAVING ROTATABLE TEMPLES

(76) Inventor: Kwang-Nam Kim, 9466 NW. 54th Doral Cir. La., Miami, FL (US) 33178

( * ) Notice: Subject to any disclaimer, the term of this patent is extended or adjusted under 35 U.S.C. 154(b) by 0 days.

(21) Appl. No.: 09/809,564

(22) Filed: Mar. 15, 2001

(30) Foreign Application Priority Data

Mar. 21, 2000 (KR) .......................................... 2000-7981

(51) Int. Cl.[7] .................................................. G02C 5/20
(52) U.S. Cl. ........................ 351/115; 351/113; 351/123
(58) Field of Search ................................ 351/113, 114, 351/121, 153, 115, 123; 16/228

(56) References Cited

U.S. PATENT DOCUMENTS 633,023 A * 9/1899 Miehle ........................ 351/115
3,549,246 A * 12/1970 Ruesch ........................ 351/153
4,750,828 A * 6/1988 Sartor ........................ 351/115

FOREIGN PATENT DOCUMENTS

JP 5-297327 * 11/1993 .................. 351/153

* cited by examiner

Primary Examiner—Huy Mai
(74) Attorney, Agent, or Firm—Davis & Bujold, P.L.L.C.

(57) ABSTRACT

Disclosed is a spectacle frame including rims which respectively surround lenses and are rested on a wearer's nose and temples which are fitted over and around the wearer's ears. The spectacle frame comprises a first spring disposed in each temple, each temple having an upper end and a lower end which is rotatably connected with the upper end, the upper end of each temple being defined with a first fastening groove in which one end of the first spring is fastened to the upper end, and the lower end of each temple being defined with a second fastening groove in which the other end of the first spring is fastened to the lower end, whereby the lower end of each temple can be rotated about an axis thereof.

7 Claims, 7 Drawing Sheets

SPECTACLE FRAME HAVING ROTATABLE TEMPLES

BACKGROUND OF THE INVENTION

1. Field of the Invention

The present invention relates to a spectacle frame having rotatable temples, and more particularly, the present invention relates to a spectacle frame having rotatable temples, which is configured in such a way as to allow the temples to be rotated in an axial direction and leftward and rightward directions, whereby, even when spectacles are worn for a lengthy period of time, the spectacles do not cause pain and/or discomfort on the top of the ear and the curved portion of the ear, and instead, enable a wearer to manually adjust the temples to accomplish a proper fit and wearing comfortableness.

2. Description of the Related Art

Generally, spectacles are divided into corrective spectacles for correcting myopia, hyperopia, astigmatism, presbyopia, etc., and protective spectacles for protecting the eyes from injurious radiation such as intensive light, ultraviolet rays, infrared rays or the like, dust, or physical dangerousness.

Referring to FIG. 1, there is shown a perspective view illustrating a construction of conventional spectacles. As can be readily seen from FIG. 1, the spectacles have a pair of lenses 1 each of which has a degree of power suitable for a wearer's eye, and a spectacle frame. The spectacle frame includes a pair of rims 2 into which the pair of lenses 1 are respectively fitted and a pair of temples 3 which are respectively connected to the pair of rims 2. The pair of rims 2 are integrally connected with each other by at least one bridging member. Also, a pair of arms are directly welded to the pair of rims 2, respectively. The pair of arms respectively carry a pair of pads which are rested on the wearer's nose. Free ends of the pair of temples 3 are fitted over and around the wearer's ears.

The spectacle frame which is composed of the rims 2 and the temples 3, is manufactured and marketed separately from the lenses 1. Since an aesthetic appearance of the wearer's face can be favorably or adversely influenced by a shape and a color of the spectacles, it is regarded as important to properly select shape and color of the spectacles.

The conventional spectacle frame constructed as mentioned above suffers from defects in that, since the pair of temples 3 can be folded in an inward direction and are prevented from being folded in an outward direction while merely having predetermined elasticity, if the spectacles are worn for a lengthy period of time, as the curved portions of the wearer's ears are pressed by the free ends of the temples 3, pain and/or discomfort can be caused.

SUMMARY OF THE INVENTION

Accordingly, the present invention has been made in an effort to solve the problems occurring in the related art, and an object of the present invention is to provide a spectacle frame having rotatable temples, which is configured in such a way as to allow the temples to be rotated in an axial direction and leftward and rightward directions, whereby, even when spectacles are worn for a lengthy period of time, the spectacles do not cause pain and/or discomfort on the top of the ear and the curved portion of the ear, and instead, enable a wearer to manually adjust the temples to accomplish a proper fit and wearing comfortableness.

In order to achieve the above object, according to one aspect of the present invention, there is provided a spectacle frame including rims which respectively surround lenses and are rested on a wearer's nose and temples which are fitted over and around the wearer's ears, the spectacle frame comprising: a first spring disposed in each temple, each temple having an upper end and a lower end which is rotatably connected with the upper end, the upper end of each temple being defined with a first fastening groove in which one end of the first spring is fastened to the upper end, and the lower end of each temple being defined with a second fastening groove in which the other end of the first spring is fastened to the lower end, whereby the lower end of each temple can be rotated about an axis thereof.

According to another aspect of the present invention, the upper end of each temple is formed, adjacent to a place where the upper end is connected with a rim portion by means of a screw, with a stepped portion which is inclined downward from an inner surface toward an outer surface of the temple, and the rim portion is formed, adjacent to the place where the rim portion is connected with the upper end of the temple by means of the screw, with a projection which is inclined downward from an inner surface toward an outer surface of the rim portion, so that the projection of the rim portion faces the stepped portion of the temple, whereby the temple can be rotated about the screw in inward and outward directions within respective predetermined angles while the stepped portion of the temple and the projection of the rim portion are engaged with or disengaged from each other.

According to still another aspect of the present invention, a second spring and a biasing plate are disposed in the rim portion, in a manner such that the second spring applies, through the biasing plate, elastic force to the upper end of the temple when the upper end of the temple is rotated about the screw in the inward and outward directions.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
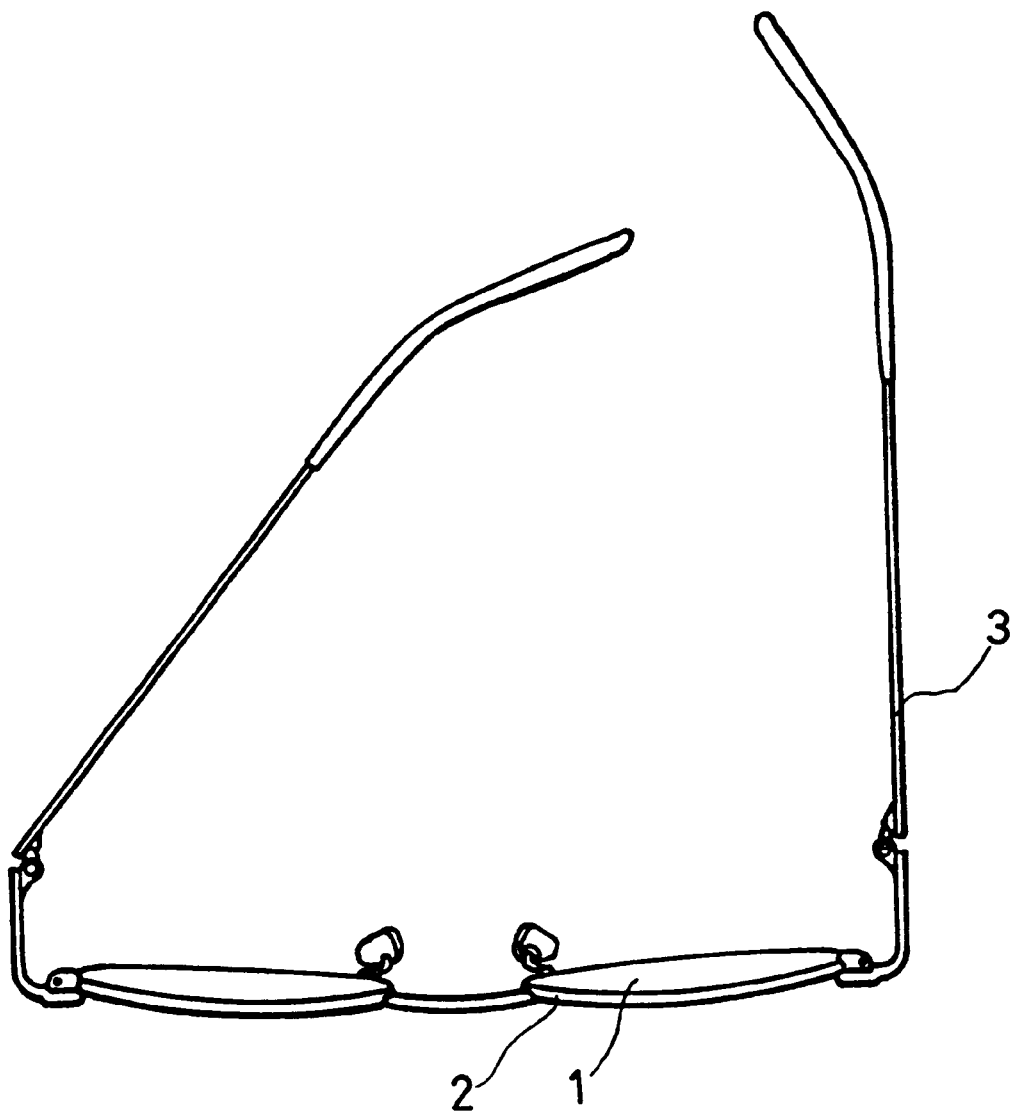
FIG. 1 is a perspective view illustrating a construction of conventional spectacles.
Figure 2:
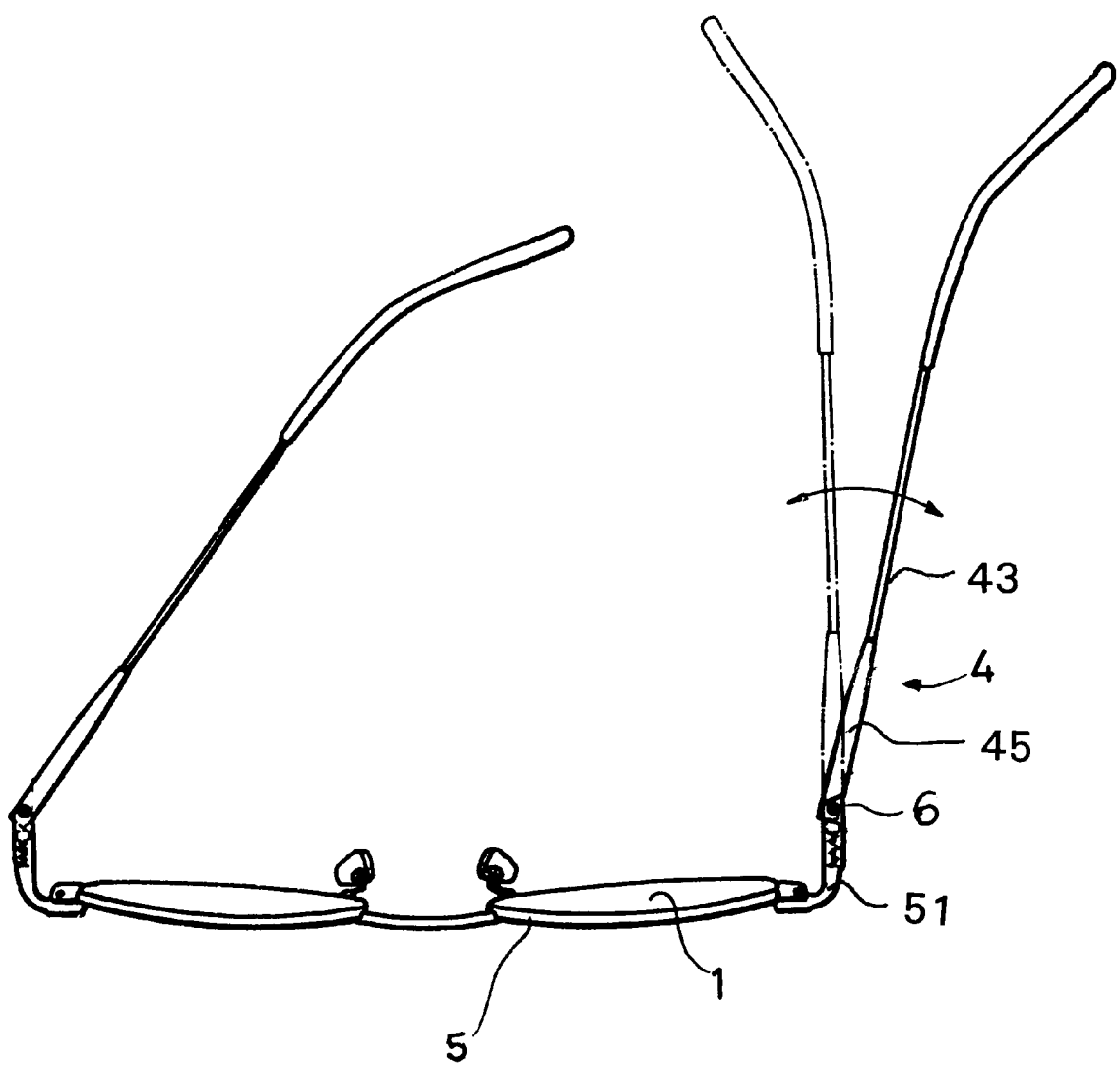
FIG. 2 is a perspective view illustrating a construction of a spectacle frame having rotatable temples in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

As shown in FIGS. 2 through 9, a spectacle frame having rotatable temples in accordance with an embodiment of the present invention includes a pair of rims 5 which respectively surround a pair of lenses 1 and are rested on a wearer's nose and a pair of temples 4 which are fitted over and around the wearer's ears. The spectacle frame further includes a pair of first springs 41 each of which is disposed in each temple 4. Each temple 4 has an upper portion 45 and a lower portion 43 which is rotatably connected with the upper portion 45. The upper portion 45 of each temple 4 is defined with a first fastening groove 44 in which one end of the first spring 41 is fastened to the upper portion 45. The lower portion 43 of each temple 4 is defined with a second fastening groove 42 in which the other end of the first spring 41 is fastened to the lower portion 43. The upper portion 45 of each temple 4 is formed, adjacent to a place where the upper portion 45 is connected with a rim portion 51 by means of a screw 6, with a stepped portion 46 which is inclined downward from an inner surface toward an outer surface of the temple 4. The rim portion 51 is formed, adjacent to the place where the rim portion 51 is connected with the upper portion 45 of the temple 4 by means of the screw 6, with a projection 55 which is inclined downward from an inner surface toward an outer surface of the rim portion 51, so that the projection 55 of the rim portion 51 faces the stepped portion 46 of the temple 4. A second spring 53 and a biasing plate 52 are disposed in the rim portion 51, in a manner such that the second spring 53 applies, through the biasing plate 52, elastic force to the upper portion 45 of the temple 4 when the upper portion 45 of the temple 4 is rotated about the screw 6 in inward and outward directions.

Hereinafter, operations of the spectacle frame having rotatable temples, according to the present invention, constructed as mentioned above, will be described in detail.

Figure 3:
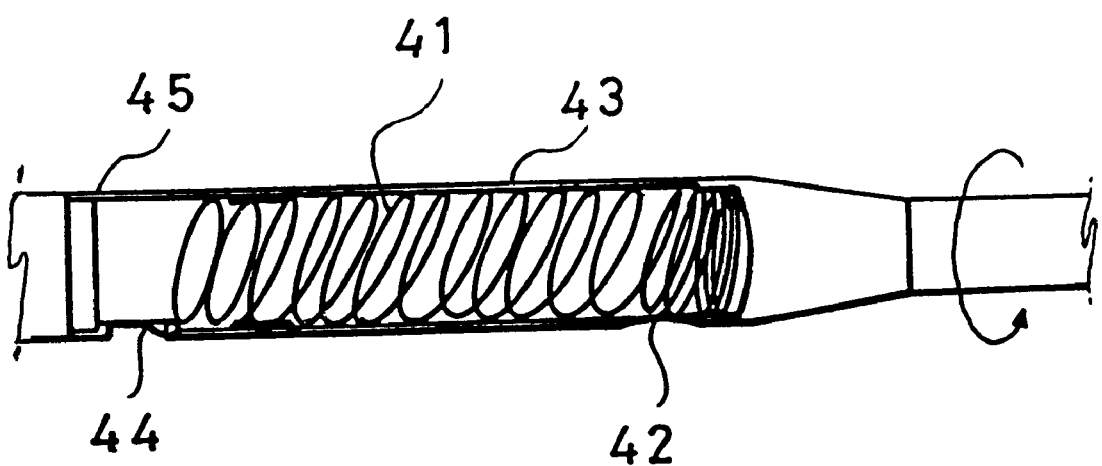
FIG. 3 is a cross-sectional view illustrating an axial rotating structure of the spectacle frame having rotatable temples in accordance with the embodiment of the present invention.

If the wearer rotates the lower portion 43 of the temple 4 about the axis of the temple 4, as can be readily seen from FIG. 3, due to the fact that the upper portion 45 of the temple 4 is coupled with the rim portion 51 by means of the screw 6, the lower portion 43 which is rotatably connected with the upper portion 45 of the temple 4, is rotated. At this time, since both ends of the first spring 41 which is disposed inside the upper portion 45 and the inner end 43 of the temple 4, are fastened to the upper and lower ends 45 and 43 in the first and second fastening grooves 44 and 42, respectively, as the first spring 41 is distorted by the rotation of the lower portion 43 of the temple 4, distortional returning force is produced in the first spring 41. Thus, if rotating force which is applied to the lower portion 43 of the temple 4 to rotate the lower portion 43 about the axis of the temple 4, is removed, the lower portion 43 of the temple 4 is returned to its original position by the distortional returning force of the first spring 41.

Figure 4:
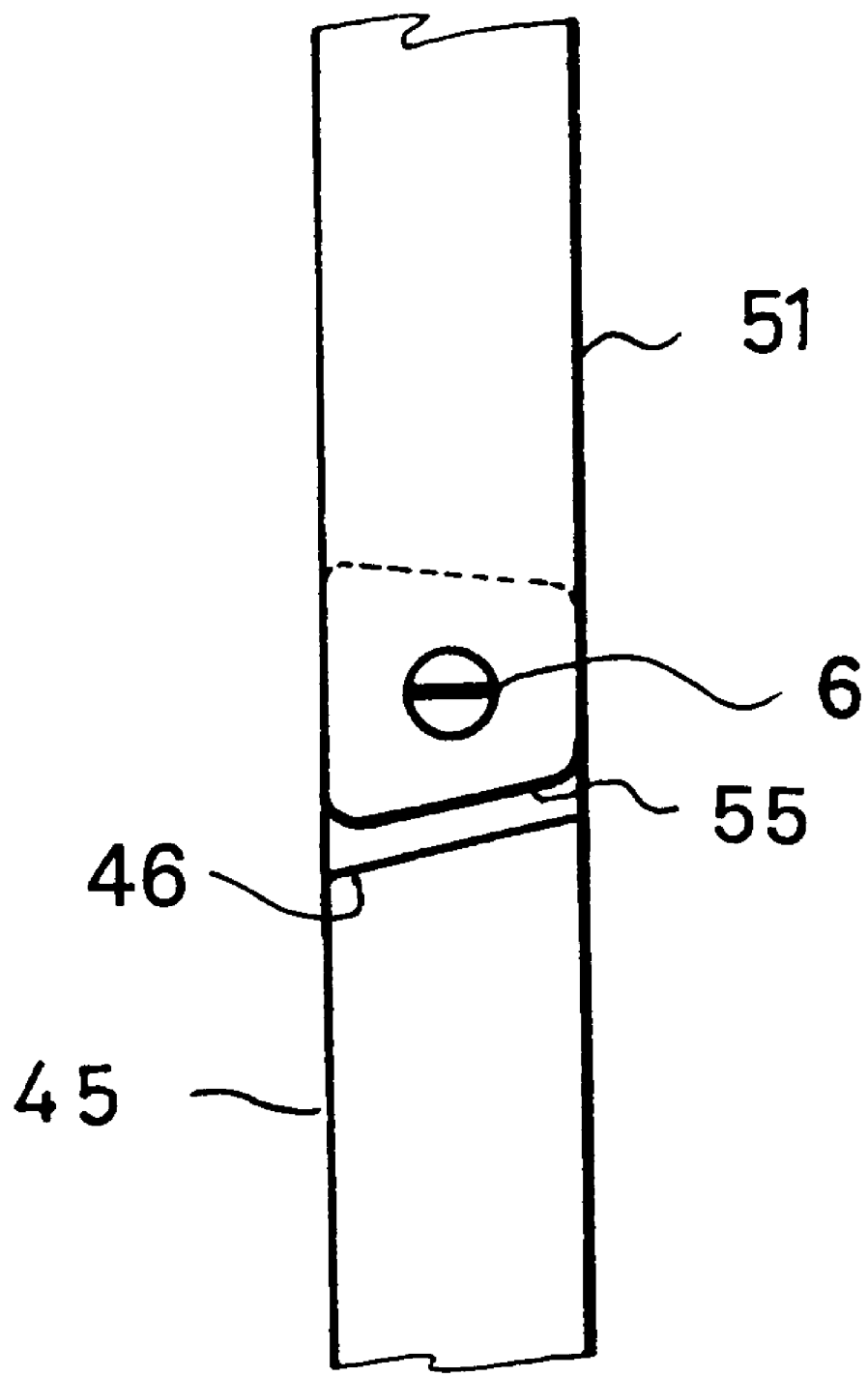
FIGS. 4 through 6 are plan views illustrating a leftward and rightward rotating structure of the spectacle frame having rotatable temples in accordance with the embodiment of the present invention.
Figure 5:
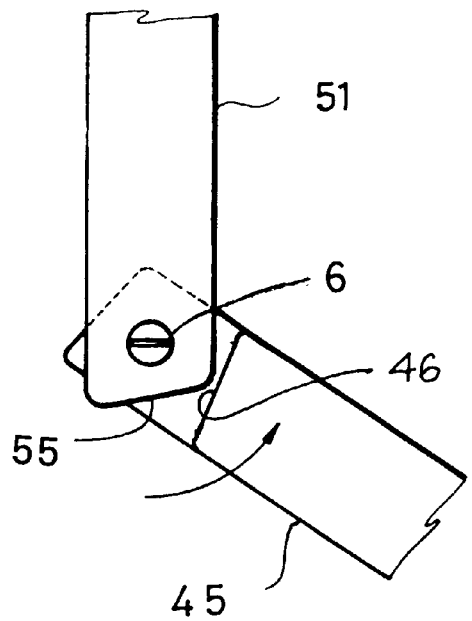
Figure 8:
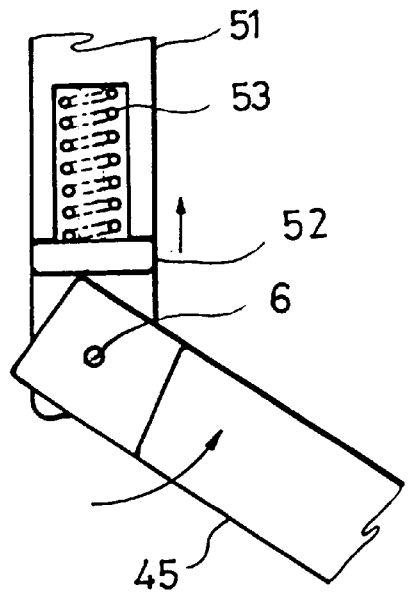

If the wearer rotates the temple 4 in the inward direction from a normal position shown in FIG. 4 toward an inward rotated position shown in FIG. 5, because the rim portion 51 is fixedly located, the upper portion 45 of the temple 4 is rotated about the screw 6 in a counterclockwise direction. At this time, due to the fact that the stepped portion 46 of the upper portion 45 of the temple 4 and the projection 55 of the rim portion 51 are not interfered by each other, the upper portion 45 of the temple 4 can be rotated up to 90° and thereby can be completely folded inward. If the upper portion 45 of the temple 4 is rotated in this way, since the returning force of the second spring 53 pushes upward the biasing plate 52 as shown in FIG. 8, the temple 4 is maintained in the folded state.

Figure 6:
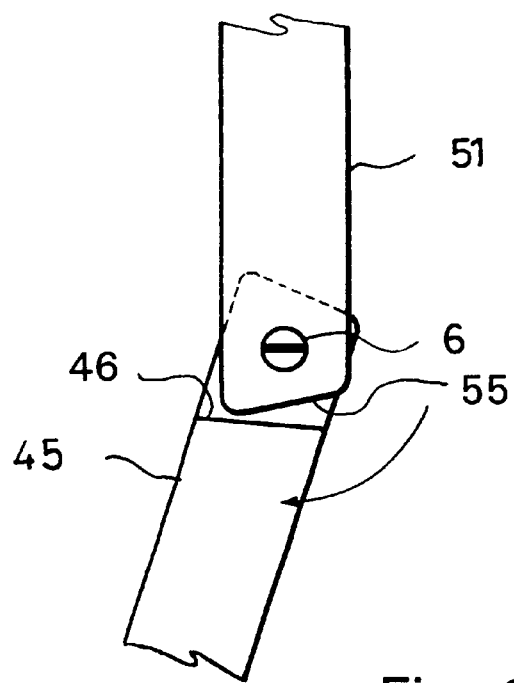
Figure 7:
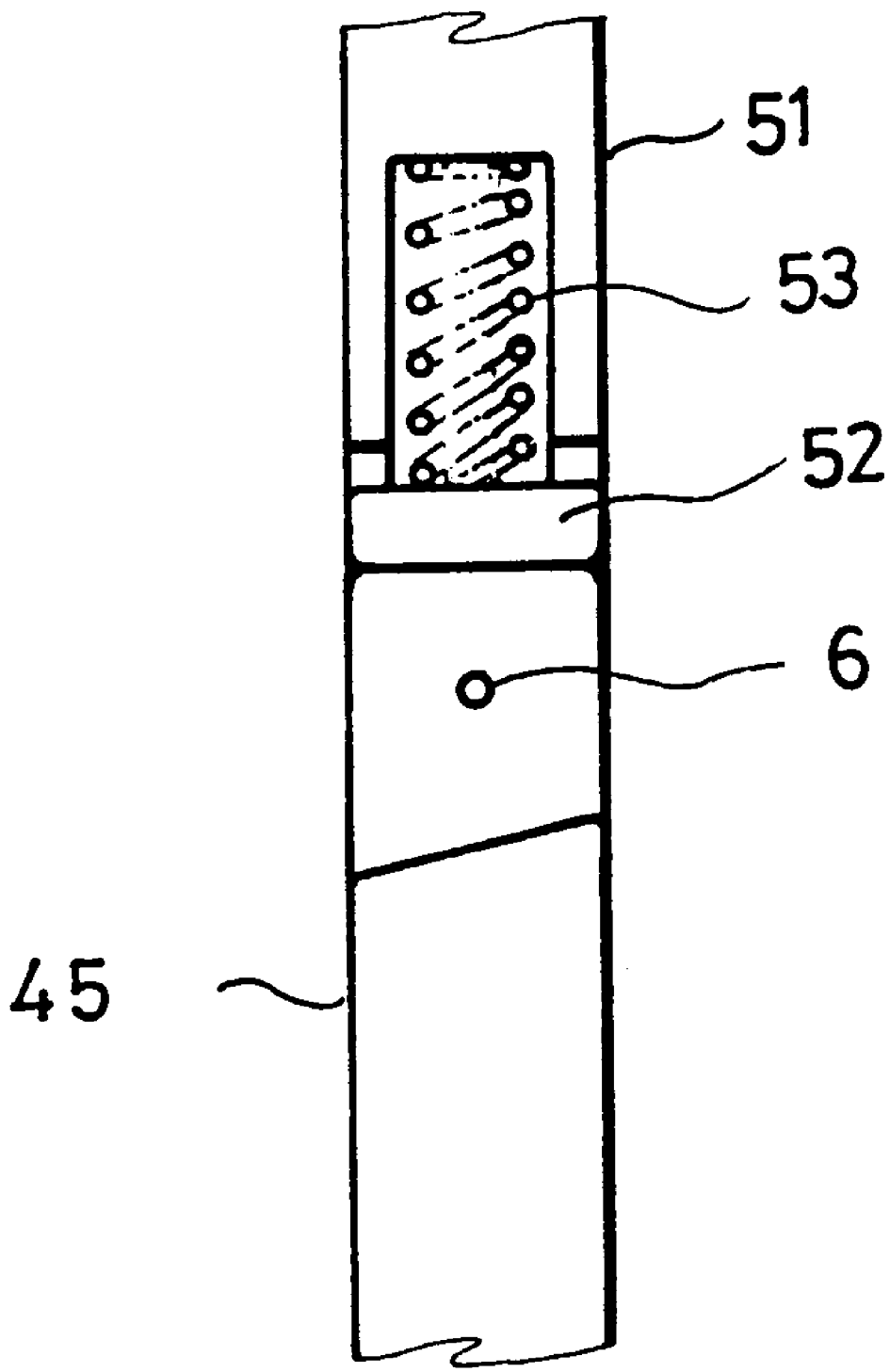
FIGS. 7 through 9 are cross-sectional views illustrating a provision for rendering elastic force upon leftward and rightward rotation of the temple of the spectacle frame in accordance with the embodiment of the present invention.
Figure 9:
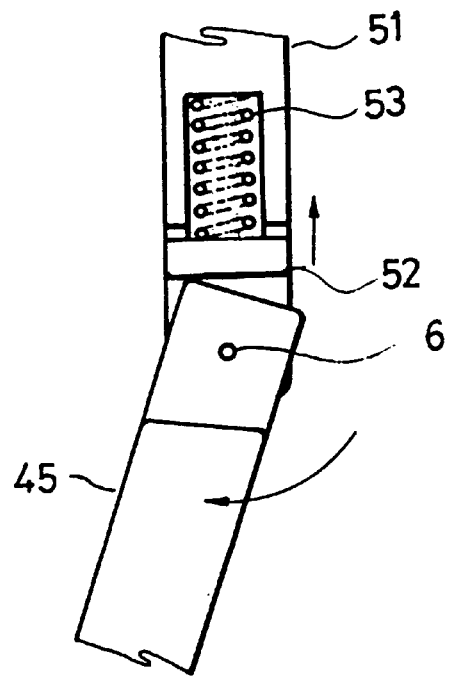

If the wearer rotates the temple 4 in the outward direction from the normal position shown in FIG. 4 toward an outward rotated position shown in FIG. 6, because the rim portion 51 is fixedly located, the upper portion 45 of the temple 4 is rotated about the screw 6 in a clockwise direction. At this time, due to the fact that the stepped portion 46 of the upper portion 45 of the temple 4 and the projection 55 of the rim portion 51 are interfered by each other, if the upper portion 45 of the temple 4 is rotated by a predetermined angle, the upper portion 45 of the temple 4 cannot be rotated anymore. In a state wherein the upper portion 45 of the temple 4 is prevented from being rotated outward, since the returning force of the second spring 53 continues to push upward the biasing plate 52 as shown in FIG. 9, the temple 4 is willing to be returned to its original position. As a consequence, if force which is applied to the temple 4, is removed, the temple 4 is returned to the original position.

As a result, the spectacle frame having rotatable temples, according to the present invention, provides advantages in that, since the spectacle frame is configured in such a way as to allow the temples to be rotated in an axial direction and leftward and rightward directions, even when spectacles are worn for a lengthy period of time, the spectacles do not cause pain and/or discomfort on the top of the ear and the curved portion of the ear, and instead, enable a wearer to manually adjust the temples to accomplish a proper fit and wearing comfortableness.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A spectacle frame including a rim portion which respectively surround lenses and are rested on a wearer's nose and temples which are fitted over and around the wearer's ears, the spectacle frame comprising:

a first spring disposed in each temple, each temple having an upper portion and a lower portion which is rotatably connected with the upper portion, the upper portion of each temple being defined with a first fastening groove in which one end of the first spring is fastened to the upper portion, and the lower portion of each temple being defined with a second fastening groove in which the other end of the first spring is fastened to the lower portion, whereby the lower portion of each temple can be rotated about an axis thereof.

2. The spectacle frame as claimed in claim 1, wherein the upper portion of each temple is formed, adjacent to a place where the upper portion is connected with a rim portion by means of a screw, with a stepped portion which is inclined downward from an inner surface toward an outer surface of the temple, and the rim portion is formed, adjacent to the place where the rim portion is connected with the upper portion of the temple by means of the screw, with a projection which is inclined downward from an inner surface toward an outer surface of the rim portion, so that the projection of the rim portion faces the stepped portion of the temple, whereby the temple can be rotated about the screw in inward and outward directions within respective predetermined angles while the stepped portion of the temple and the projection of the rim portion are engaged with or disengaged from each other.

3. The spectacle frame as claimed in claim 2, wherein a second spring and a biasing plate are disposed in the rim portion, in a manner such that the second spring applies, through the biasing plate, elastic force to the upper portion of the temple when the upper portion of the temple is rotated about a screw in the inward and outward directions.

4. A spectacle frame comprising:
- a rim portion for supporting a pair of lenses, and the rim portion being shaped to support the spectacle frame on a nose of a wearer; and
- a pair of spaced apart pivotable temples, each one of the pair of pivotable temples having a first end attached to the rim portion and a second end which is shaped to accommodate an ear of the wearer, and the pair of spaced apart pivotable temples each having a folded position and an in use position;

wherein each one of the pair of spaced apart pivotable temples further comprises:
- an upper portion rotatably connected with a lower portion by a torsion spring, the upper portion has a first fastening groove in which a first end of the torsion spring is fastened, and the lower portion has a second fastening groove in which a second opposed end of the torsion spring is fastened, and the torsion spring allows the lower portion to be axially rotated, relative to the upper portion about a longitudinal axis of the temple, by torsional deflection of the torsion spring.

5. The spectacle frame according to claim 4, wherein the first end of each temple is connected with the rim portion by a screw which extends substantially perpendicular to the longitudinal axis of the temple, the first end of each temple is provided with a stepped portion which defines an inclined edge extending between an inner surface and an outer surface of the temple, and the rim portion is formed, having a mating stepped projection to connect with the first end of the temple via the screw, the projection is matchingly inclined with the edge between an inner surface and an outer surface of the rim portion, and the upper portion and the lower portion of each temple are co-axially rotatable about the screw to the folded position of the temple and the in use position of the temple about a predetermined angle.

6. The spectacle frame according to claim 5, wherein the stepped projection further comprises a second spring which forces a biasing plate against the first end of the temple so that the second spring applies an elastic return force to the upper portion of the temple, via the biasing plate, when the temple is rotated about the screw toward the folded position of the temple and the in use position of the temple.

7. A spectacle frame comprising:
- a rim portion supporting a pair of lenses, and an intermediate area of the rim portion being shaped to support the spectacle frame on a nose of a wearer; and
- a pair of spaced apart pivotable temples, each one of the pair of pivotable temples having a first end attached to the rim portion and a second end which is shaped to accommodate an ear of the wearer, and the pair of spaced apart pivotable temples each having a folded position and an extended in use position;

wherein each one of the pair of spaced apart pivotable temples further comprises an upper portion connected to the first end which is pivotally connected to the rim portion and a lower portion connected to the second end which is shaped to accommodate the ear of the wearer, the upper portion having a first fastening groove in which a first end of a torsion spring is fastened, and the lower portion having a second fastening groove in which a second opposed end of the torsion spring is fastened, and the torsion spring allows the lower portion to be axially rotated, relative to the upper portion about a longitudinal axis defined by the temple, by torsional deflection of the torsion spring.

* * * * *